United States Patent [19]

Chuang

[11] Patent Number: 5,332,086
[45] Date of Patent: Jul. 26, 1994

[54] FLOPPY DISC STORAGE CASE

[76] Inventor: Kou S. Chuang, 8F-6, No. 100, Sec. 2, Hoping E. Rd., Taipei, Taiwan

[21] Appl. No.: 41,984

[22] Filed: Apr. 2, 1993

[51] Int. Cl.5 .............................................. B65D 85/57
[52] U.S. Cl. .................................. 206/45.15; 206/444
[58] Field of Search ............... 206/45.13, 45.15, 45.17, 206/45.18, 309, 311, 312, 444; 312/9.58–9.61

[56] References Cited

U.S. PATENT DOCUMENTS

| | | | |
|---|---|---|---|
| 3,265,453 | 8/1966 | Seide | 312/9.59 |
| 4,844,260 | 7/1989 | Jaw | 206/444 |
| 4,875,743 | 10/1989 | Gelardi et al. | 206/309 |
| 5,099,995 | 3/1992 | Karakane et al. | 312/9.58 |
| 5,176,250 | 1/1993 | Cheng | 206/45.13 |
| 5,197,600 | 3/1993 | Garcia | 206/444 |

Primary Examiner—Jimmy G. Foster
Attorney, Agent, or Firm—Browdy and Neimark

[57] ABSTRACT

Disclosed is a floppy disc storage case including a U-shaped casing having two symmetrical open chambers, at two opposite sides, two symmetrical sets of partition boards pivotally received in the open chambers and defining a series of floppy disc storage compartments, two symmetrical stop plates pivotally received in the open chambers to stop the partition boards inside the casing, whereby turning either stop plate outwards from either open chamber causes the partition boards to be spread out like a fan for arranging floppy discs conveniently.

1 Claim, 5 Drawing Sheets

FLOPPY DISC STORAGE CASE

BACKGROUND OF THE INVENTION

The present invention relates to floppy disc storage cases, and more particularly the present invention relates to a storage case for keeping 3½ computer floppy discs in order which can be spread out like a fan for arranging floppy discs conveniently.

A variety of storage cases have been disclosed for keeping computer floppy discs, and have appeared on the market. These storage cases may have stacks of compartments for keeping individual floppy discs, however, they are commonly heavy and of low mobility, and require much installation space. Further, these storage cases can not be fully spread out for arranging floppy discs conveniently.

SUMMARY OF THE INVENTION

The main object of the present invention is to provide a floppy disc storage case which can be spread out like a fan for arranging floppy discs conveniently. Another object of the present invention is to provide a floppy disc storage case which is easy of use, and needs less desk space.

According to the preferred embodiment of the present invention, the floppy disc storage case is comprised of two symmetrical sets of partition boards pivotally fastened inside two symmetrical open chambers in a casing by pivots, and two symmetrical stop plates pivotally connected to the pivots to stop the partition boards inside the casing. The stop plates and the partition boards have flanges, and the partition boards have projecting rods corresponding to the flanges. Turning either stop plate outwards causes the respective flange to move the respective projecting rod so that the respective set of partition boards are spread out like a fan for arranging floppy discs conveniently.

DETAILED DESCRIPTION OF THE PREFERRED EMBODIMENT

Figure 1:
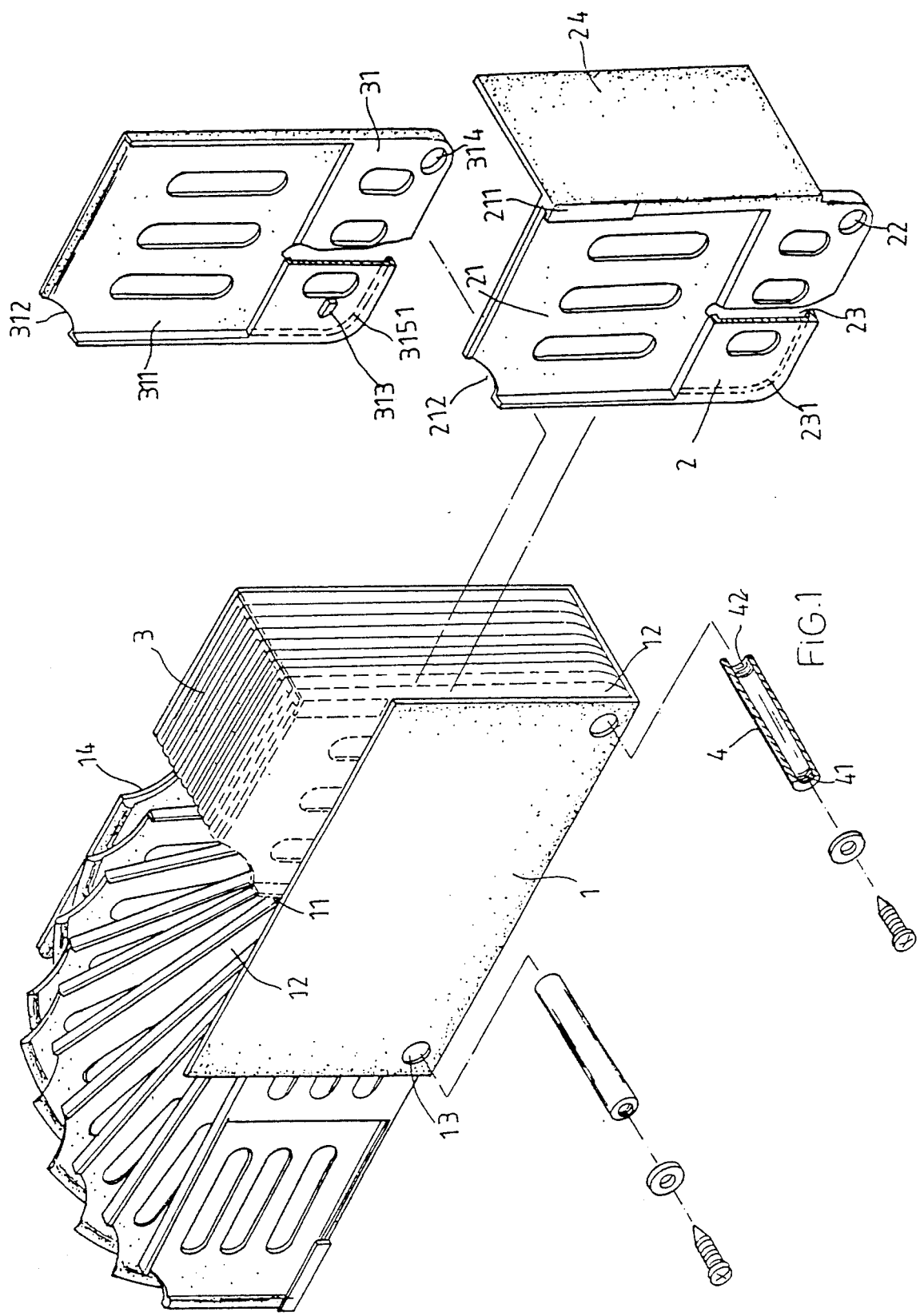
FIG. 1 is a perspective and partial exploded view of a floppy disc storage case embodying the present invention.
Figure 2:
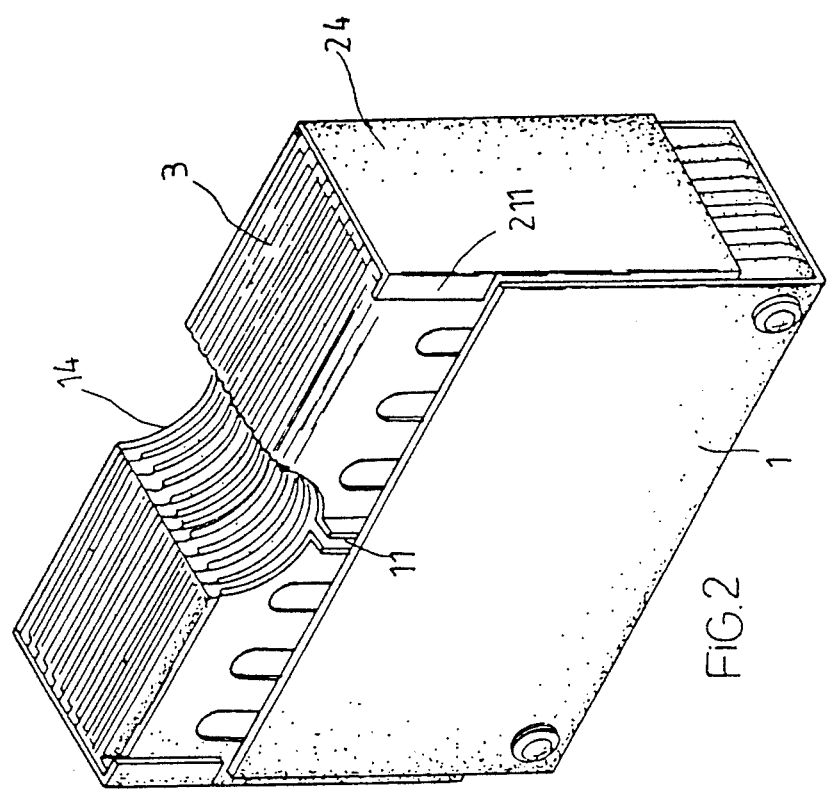
FIG. 2 is a perspective of the floppy disc storage case shown in FIG. 1 when closed.

Referring to FIG. 1, a floppy disc storage case constructed in accordance with the present invention is generally comprised of a substantially U-shaped casing 1, one pair of stop plates 2, a plurality of partition boards 3, and a pair of pivots 4. The casing 1 is divided into two opposite open chambers 12 by a middle division wall 11, having two through holes 13 at two bottom corners thereof into which either pivot 4 is inserted. As illustrated in FIG. 2, a half-round recess 14 is formed in the middle at the top as the case is closed. The stop plates 2 are respectively and pivotably fastened in either open chamber 12 to stop the partition boards 3 inside the floppy disc storage case. Each stop plate 2 comprises a peripheral flange 231, a ¼ round notch 212 at a top corner thereof above the peripheral flange 231, a plurality of finger slots 21, a stop strip 211 at a top corner opposite to the ¼ round notch 212, a groove 23 on the back of stop plates 2 near the bottom, and an extension wall 24 perpendicularly extended from one longitudinal side of stop plates 2. The partition boards 3 are arranged into two sets respectively received in either open chamber 12 and stopped by the extension wall 24 of either stop plate 2. Each partition board 3 is made from a flat board 31 having finger slots 311, a ¼ round notch 312, a peripheral flange 3151, and a through hole 314 respectively disposed at locations corresponding to the finger slots, ¼ round notch, peripheral flange and through hole on the stop plates 2, and a projecting rod 313 at the back of each partition board 3. The pivots 4 are respectively inserted into respective through holes 13;22;314 on the casing 1, the stop plates 2, and the partition boards 3 for permitting the stop plates 2 and the partition boards 3 to be bilaterally spread out of the open chambers 12. Each pivot 4 has two screw holes 41,42 on two opposite ends thereof.

Referring to FIG. 2 and FIG. 1 again, the partition boards 3 and the stop plates 2 are symmetrically placed in the open chambers 12, then the pivots 4 are respectively inserted into the respective through holes 13;22;314 and secured in place by screws, to hold the partition boards 3 and the stop plates 2 to the casing 1.

Figure 3:
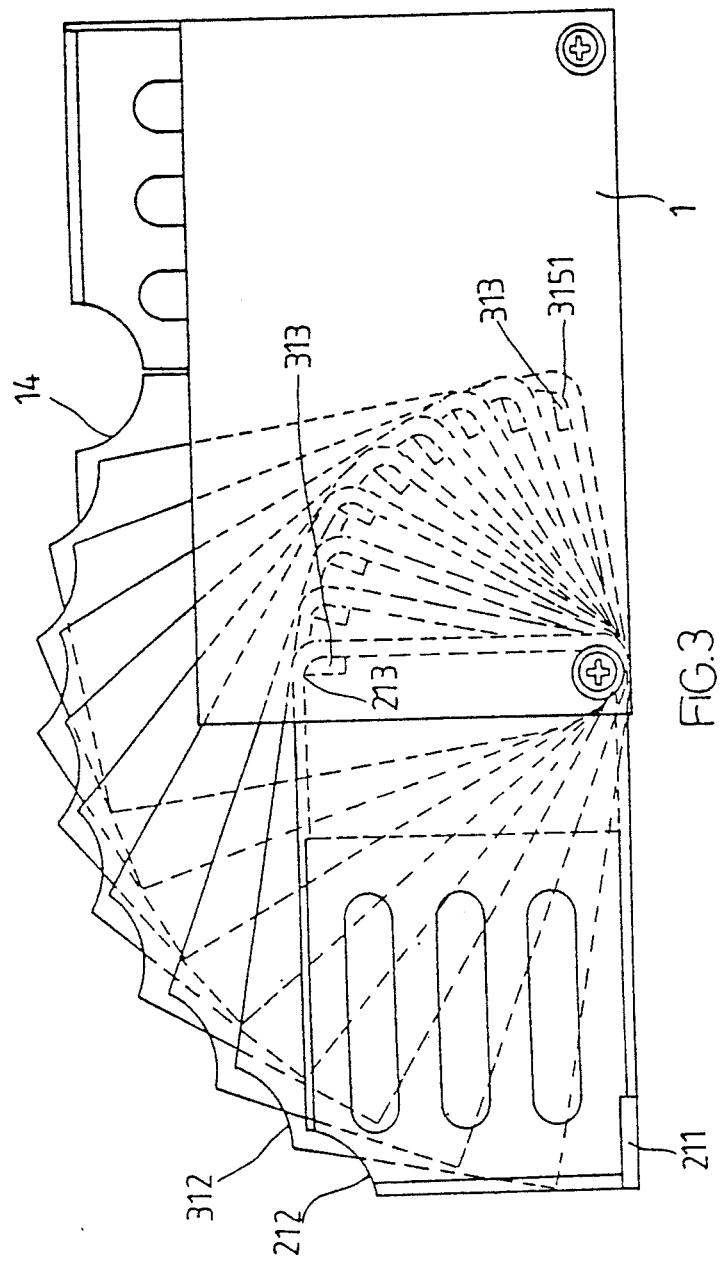
FIG. 3 is a plan view of the floppy disc storage case shown in FIG. 1, showing the partition boards spread out.

Referring to FIG. 3, turning either stop plate 2 outwards causes the groove 23 and the peripheral flange 231 to turn the projecting rod 313 of the closest partition board outwards, and the following partition boards will be turned outwards one after another in the same manner, and therefore the stop plate and the partition boards in the same open chamber are spread out like a fan.

Figure 4:
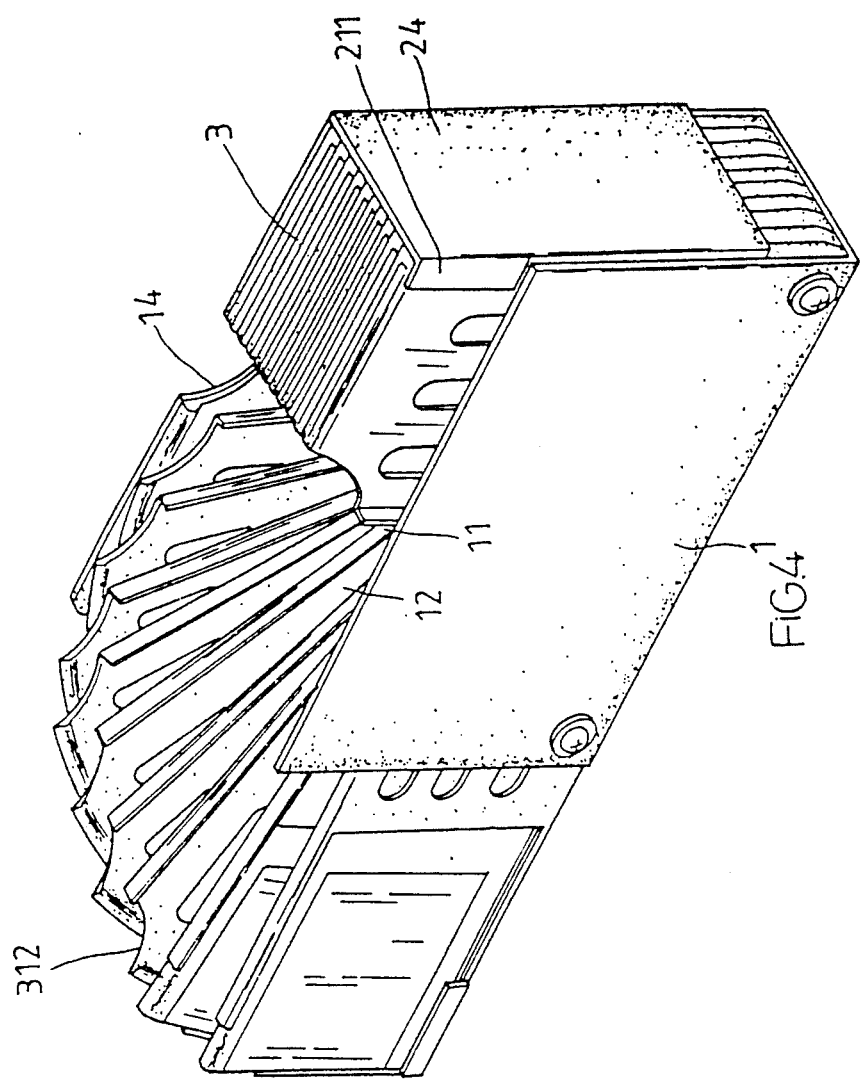
FIG. 4 is a perspective view of the floppy disc storage case shown in FIG. 1 when half opened.
Figure 5:
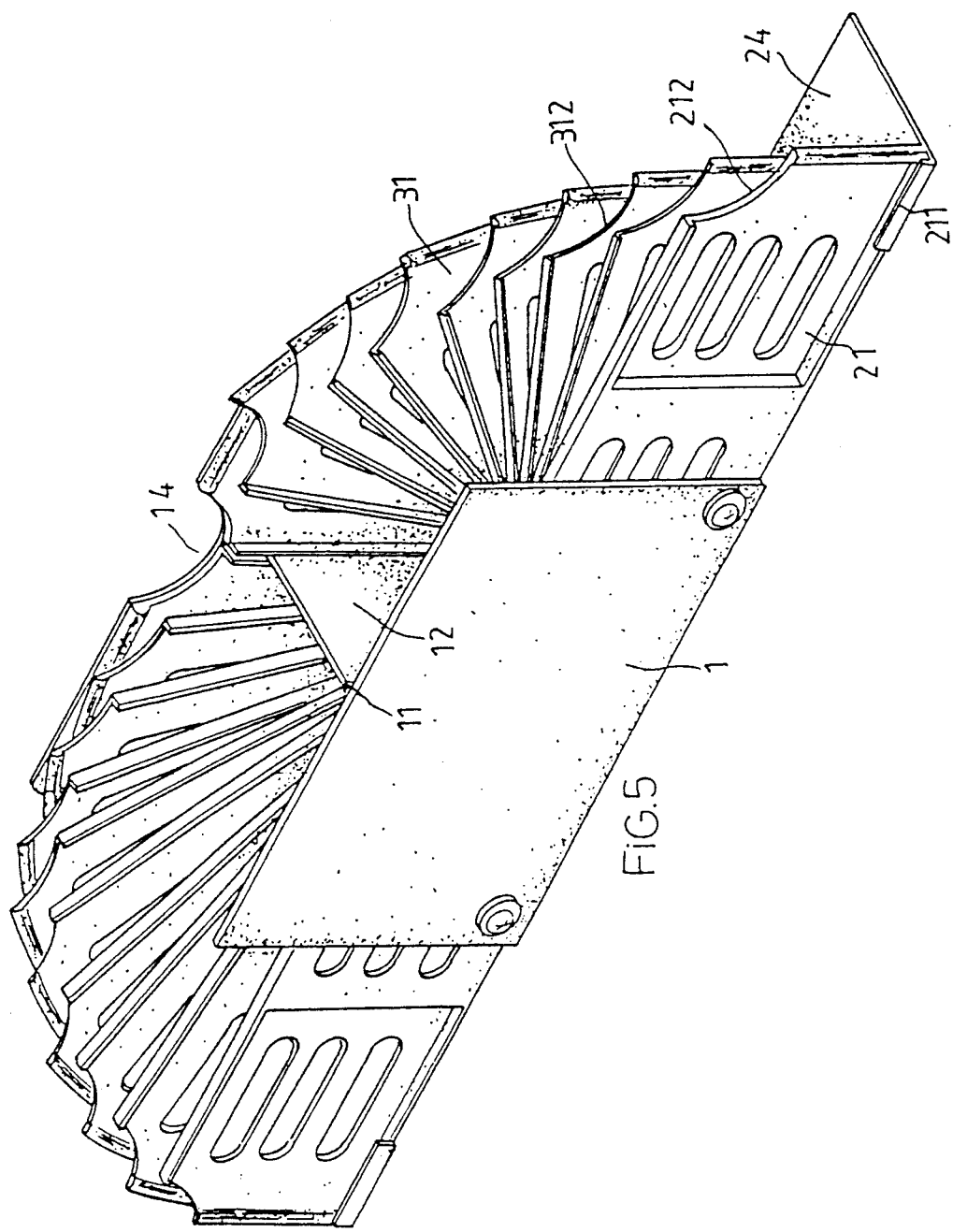
FIG. 5 is a perspective view of the floppy disc storage case shown in FIG. 1 when fully spread out.

Referring to FIG. 4, when the partition boards 3 are spread out, a floppy disc can be conveniently inserted in either compartment defined between either two partition boards, or the floppy disc in either compartment can be conveniently taken out.

While only one embodiment of the present invention has been shown and described, it will be understood that various modifications and changes could be made without departing from the spirit and scope of the invention.

What is claimed is:

1. A floppy disc storage case comprising:
    a substantially U-shaped casing divided into two opposite open chambers by a middle division wall, having two through holes at two opposite corners thereof;
    two stop plates respectively received in said open chambers and pivotally connected to said casing, each stop plate comprising a peripheral flange, a ¼ round notch at a top corner thereof, a plurality of finger slots, a stop strip at an opposite top corner thereof, a groove on a back of each of said two stop plates near a bottom of said stop plates, and an extension wall perpendicularly extended from one longitudinal side thereof;
    a plurality of partition boards arranged into two sets respectively received in either open chamber and stopped by the extension wall of either stop plate, each partition board comprising finger slots, a ¼ round notch, a peripheral flange, and a through hole respectively disposed at locations corresponding to the finger slots, ¼ round notch, peripheral flange and through hole on said stop plates, and a projecting rod at a back of each of said plurality of partition boards;

two pivots respectively inserted into respective through holes on said casing, said stop plates, and said partition boards for permitting said stop plates and said partition boards to be reversibly and bilaterally spread out of said open chambers, each pivot having two screw holes on two opposite ends thereof respectively fastened to either side wall of said casing by screws;

whereby turning either stop plate outwards from the respective open chamber causes the groove and peripheral flange on the respective stop plate and said partition boards to turn the respective projecting rod outwards in spreading out the respective partition boards.

* * * * *